United States Patent [19]
Bell

[11] Patent Number: 4,998,127
[45] Date of Patent: Mar. 5, 1991

[54] CAMERA WITH FLASH RETURN SENSING

[75] Inventor: Cynthia S. Bell, Webster, N.Y.

[73] Assignee: Eastman Kodak Company, Rochester, N.Y.

[21] Appl. No.: 387,469

[22] Filed: Jul. 31, 1989

[51] Int. Cl.⁵ .............................................. G03B 7/00
[52] U.S. Cl. ................................... 354/413; 354/417; 354/432
[58] Field of Search ............................... 354/413–424, 354/429, 431, 432, 105, 106, 109

[56] References Cited

U.S. PATENT DOCUMENTS

| | | | |
|---|---|---|---|
| 4,429,966 | 2/1984 | Hosoe et al. | 354/417 |
| 4,484,807 | 11/1984 | Kataoka et al. | 354/415 |
| 4,501,481 | 2/1985 | Kataoka et al. | 354/413 |
| 4,569,580 | 2/1986 | Kataoka et al. | 354/415 |
| 4,615,599 | 10/1986 | Kataoka et al. | 354/415 |
| 4,742,369 | 5/1988 | Ishii et al. | 354/909 |
| 4,811,042 | 3/1989 | Cloutier et al. | 354/105 |

*Primary Examiner*—L. T. Hix
*Assistant Examiner*—David M. Gray
*Attorney, Agent, or Firm*—Edward Dugas

[57] ABSTRACT

A camera includes both film for recording an image and a solid state image sensor. The solid state sensor determines the brightness level after the flash has been fired in order to determine whether enough light has reached the camera for a proper exposure. If insufficient light is returned from the flash, as in a "stadium" shot, the camera indicates either to the operator or to the printer that this problem exists. Appropriate steps may then be taken either by repeating the shot or by adjusting the printing process.

12 Claims, 3 Drawing Sheets

CAMERA WITH FLASH RETURN SENSING

BACKGROUND OF THE INVENTION

1. Field of the Invention

The present invention relates to a photographic camera and more particularly to a camera including both photographic film and a solid state sensor.

2. Discussion of the Background

Cameras are known which both record an image on photographic film and also produce an image electronically. In general, these cameras include not only traditional optics and film handing mechanisms for the film but also include a solid state imaged to view the image electronically. The electronic image is used to preview a scene before exposing the film or to review a shot to ascertain that the composition in the picture is correct.

U.S. Pat. No. 4,742,369 shows a camera having both photosensitive film and a solid state imaging element. This camera as well as other prior art includes basically two separate systems to record the film image and the electronic image.

A more advanced camera has recently been described in copending application 288,887 which was filed in the U.S. Patent and Trademark Office on Dec. 20, 1988. In this device, the electronic and film recording mechanisms are integrated so as to form a less expensive and less complicated device. This camera also has a number of functions which are controlled by &he solid state image sensor. Thus, functions such as exposure control and autofocus can be accomplished. Furthermore, the image sensed electronically can also be displayed to the operator. However, this camera does not provide for the function of determining whether proper illumination has resulted from the use of a flash and in particular no mechanism is available for taking remedial steps if the flash is insufficient.

SUMMARY OF THE INVENTION

It is therefore an object of the present invention to provide a novel camera function which measures the brightness level after a flash has been fired.

It is a further object of the invention to provide a method for sampling the brightness level after a flash and determining whether it is sufficiently bright or not and for providing an indication of this.

It is a further object of the invention to provide a method for correcting the situation of too little light being returned from a flash.

Another object of the present invention is to provide an inexpensive and uncomplicated camera which can determine whether a minimum brightness level has been returned from the flash and which can indicate to the operator or to the printer the fact that insufficient flash return has resulted.

Briefly these and other objects of the invention are achieved by providing a solid state image sensor which can be sampled after a flash has occurred to determine the brightness level of the returned flash. This is compared to a reference level and if the brightness is below a minimum, an indication of this may be displayed. The indication may be to the operator or may be indicated on the film so that the printer may overcome the problem.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
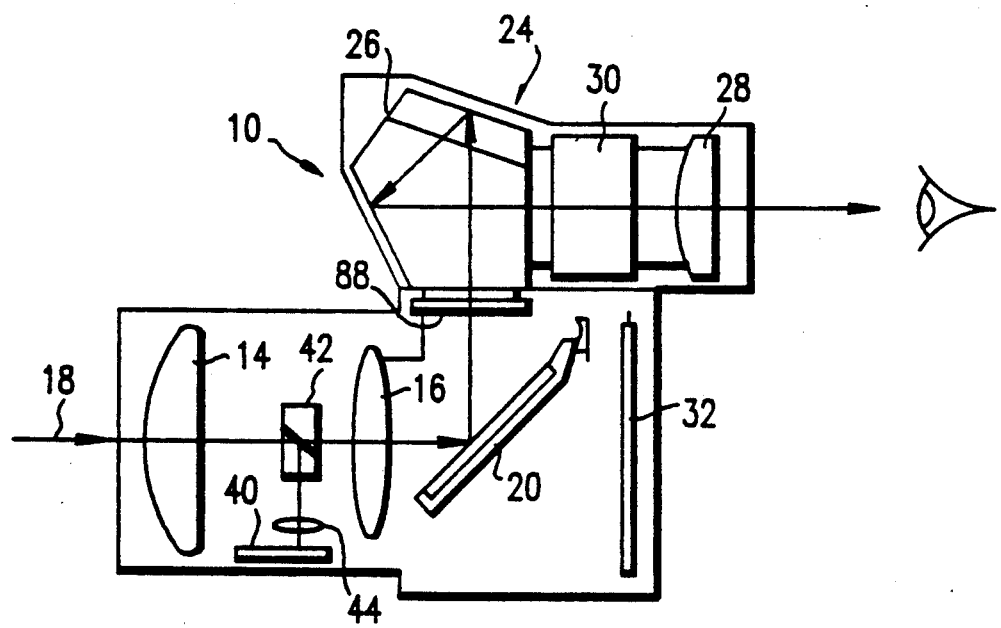
FIG. 1 is a schematic overall view of the camera in which the present invention may be placed.

Various other objects, feature's and attendant advantages of the present invention will be more fully appreciated as the same becomes better understood from the following detailed description when considered in connection with the accompanying drawings in which like reference characters designate like or corresponding parts throughout the several views and in particular FIG. 1 which shows the overall arrangement of a camera in which the present invention may be utilized. The camera 10 includes optical elements 14 and 16 which are disposed along an axis 18. Incoming light is carried along this axis and reflected by mirror 20 onto a ground glass viewing screen 88. The image on this screen may be viewed through viewfinder 24 which include a prism 26, mirror 30 and eyepiece 28. When a shot is to be taken, the mirror 20 pivots upwardly to a horizontal position so as to expose film 32.

A solid state image sensor 40 is also provided which receives light from beamsplitter 42 which is placed on the optical axis 18. The light is focused onto the sensor by means of lens 44. A splitter may be used which transmits about 80% of the light to the film and about 20% to the image sensor 40. The camera includes a number of other parts, which are not shown in the figures for the sake of clarity. Although the present invention is shown in conjunction with a camera having film and a solid state imager, it could also be used for cameras having totally electronic sensors. It can also be used for moving picture cameras of either type.

The sensor can be a charge-coupled device (CCD) such as an interline CCD image sensor, number KAI-0280, manufactured by Eastman Kodak Company of Rochester, New York. This type of sensor uses photodiodes as the image sensing elements. However, other types of sensors could be used as well.

Figure 2:
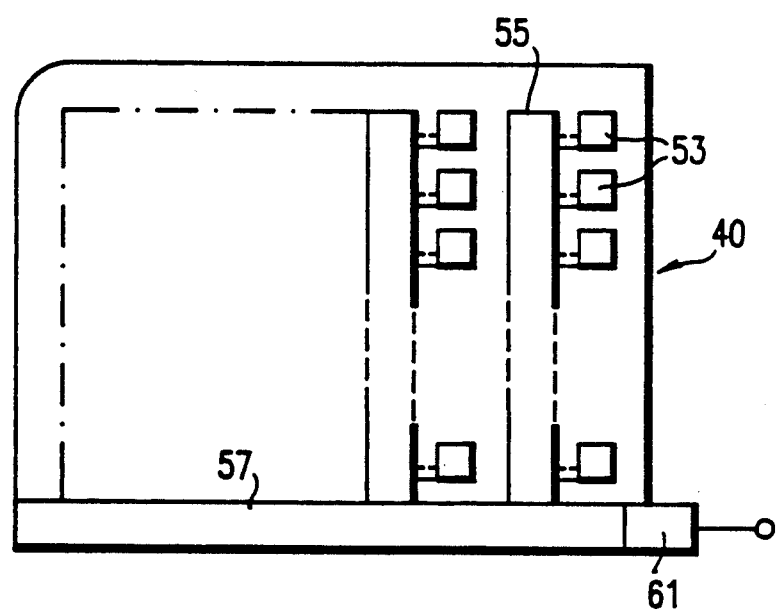
FIG. 2 is a schematic of the solid state image sensor used in the present invention.

FIG. 2 shows the arrangement of the photodiodes 53 in a matrix on the sensor 40. The photodiodes are connected to a series of vertical shift registers 55. The charge collected on each photodiode is transferred to the corresponding shift register and then transported to a single horizontal shift register 57. An output section 61 converts the charge to a voltage signal. Clock signals are provided to shift the registers at appropriate times.

Since the present sensor may be utilized for a number of functions, it is preferable to include an entire matrix as shown in FIG. 2. However, for the function of the present invention it is only necessary to utilize a single photo diode, a small group of photodiodes or a single column of photodiodes. Thus, if other functions are not necessary, a much smaller sensor array can be utilized. Alternatively, if it is necessary to have the entire matrix due to other functions, it is possible to only sense the desired elements, such as a single vertical column.

Figure 3:
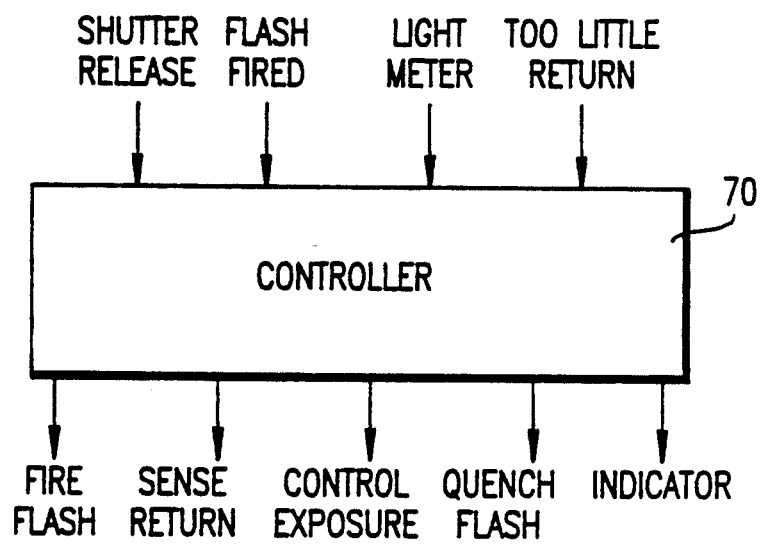
FIG. 3 is a schematic of the controller used in the present invention.

The particular functions which are based on the sensor array are controlled by a system controller 70 shown in FIG. 3. This controller operates in response to inputs from the camera such as the movement of the shutter release and the completion of the flash. Based on these and other inputs, the various functions to control the exposure and to quench the flash may be accomplished. Likewise, the brightness level of the return light from the flash may also be determined by the controller based on the output of the sensor. When the flash has been fired, the controller senses the firing and indicates to the sensor that this has occurred. The sensor samples the light from the flash that is returned by objects in the scene with the elements of the array. The signals from these elements are compared to a reference signal indicating the minimum brightness level which is acceptable. If the minimum brightness level has been equalled or exceeded, the camera continues to operate in a standard fashion. However, if the signal from the sensor is less than that of the reference signal, indicating that the minimum brightness level has not been reached, a signal is sent to the controller to indicate this. This situation may occur in a "stadium" shot, where the objects in the scene are so far removed that very little of the light from the flash is returned. The controller then orders a special procedure. The specific operation taken may include an indication to the operator so that a second shot can be taken. Another possibility is an indication placed on the film so that when the film is being developed, the printer will detect the problem and compensate for the lack of brightness. It may also be possible to extend the exposure period to compensate for the lack of the flash return.

Figure 4:
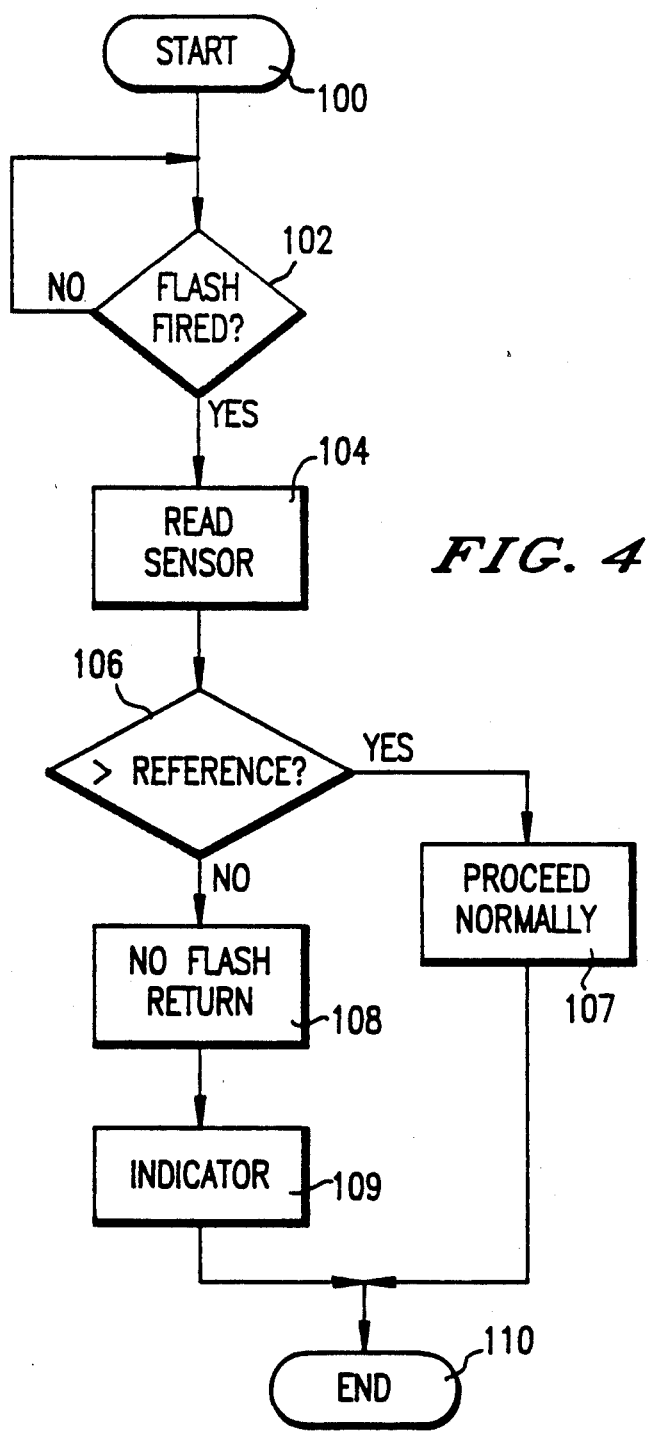
FIG. 4 is a flow chart indicating the sequence of the operation used in the present invention.

This particular sequence of events is shown in FIG. 4 with the start procedure shown as 100. The determination as to whether the flash has been fired is indicated as step 102. If the flash has not yet been fired the process returns to start and repeats until such a determination is made. When the flash has been fired, an order is sent to the sensor for the appropriate elements to be read (step 104). The signals read are compared in step 106 to a reference value. If the values from the sensor are greater than the reference value, the process proceeds normally as indicated by step 107 and the process continues to the end at step 110. If not, the comparison sends a no flash return signal at step 108 to the controller. In step 109 the controller proceeds to give an indication of the problem to the operator or places an indication on the film for the printer to read. After this process is completed the sequence again reaches the end step 110.

As indicated above, the indicater step may be replaced by a more positive action such as extending the exposure time of the shot.

If an indication is given to the operator, he has the option of then repeating the shot with the necessary modifications to the exposure time or other parameters in order to produce a good picture. If an indication is placed on the film, the information is given to the developer so that when the printing operation proceeds, appropriate compensation can be given for the lack of light. Of course, if the decision concerning the return light is quick enough, the exposure time of the camera may automatically be extended in order for sufficient light to reach the film and thus indications to either the operator or printer would then be unnecessary.

Obviously, numerous modifications and variations of the present invention are possible in light of the above teachings. It is therefore to be understood that within the scope of the appended claims, the invention may be practiced otherwise than as specifically described herein.

What is claimed is:

1. A method for operating a photographic camera having a sensor array and a flash, in order to properly expose a frame of photographic film, comprising the steps of:
    a) opening the shutter to expose said photographic film;
    b) responsive to the opening of the shutter actuating the flash;
    c) sensing with the sensor array after actuating the flash the light from the flash which is returned to the camera;
    d) comparing the sensed light with a predetermined value and producing a "low light" signal when the sensed light is less than said predetermined value; and
    e) modifying the exposure parameters responsive to said low light signal and exposing said frame of photographic film according to said modified exposure parameters.

2. The method according to claim 1, further comprising the step of indicating to the operator that too little light has been returned.

3. The method according to claim 1, further comprising the step of placing an indicator on film that too little light has been returned.

4. The method according to claim 1, further comprising the steps of producing a signal indicative of sufficient light when the sensed light is greater than or equal to said predetermined value; and
    proceeding normally when said signal indicative of sufficient light is produced.

5. The method according to claim 1, wherein the entire array is used to sense the flash return.

6. The method according to claim 1, wherein only a part of said array is used to sense the flash return.

7. The method according to claim 1, wherein a single sensor of said array is used to sense the flash return.

8. The method according to claim 1, wherein said step of modifying the exposure parameters comprises increasing the exposure time to allow ambient light to expose said frame of photographic film.

9. A camera having a sensor array and a flash, for exposing a frame of photographic film, comprising:
    (a) means for opening a shutter for exposing said photographic film;
    (b) means, responsive to said shutter means, for actuating said flash,
    (c) means, responsive to said flash actuating means, for controlling said sensor array to sample the light from the flash which is returned to the camera;
    (d) means for comparing the sensed light with a predetermined value and producing a low light signal when the sensed light is less than said predetermined value; and
    (e) means, responsive to said low light signal, for exposing said frame of photographic film according to a different set of exposure parameters.

10. The camera according to claim 9, further comprising means responsive to said low light signal for indicating to the operator that too little light was returned.

11. The camera according to claim 9, further comprising means responsive to said low light signal for indicating on said film that too little light was returned.

12. The camera according to claim 9, wherein said different set of exposure parameters includes an increased exposure time sufficient to allow ambient light to expose said frame of photographic film.

* * * * *